United States Patent [19]

Sugisawa et al.

[11] Patent Number: 4,943,360
[45] Date of Patent: Jul. 24, 1990

[54] PROCESS FOR RECOVERING NITRIC ACID AND HYDROFLUORIC ACID FROM WASTE PICKLE LIQUORS

[75] Inventors: Masanori Sugisawa; Takashi Sasaki; Yoshihito Nishimoto, all of Hyogo, Japan

[73] Assignee: Shinko Pantec Company, Limited, Kobe, Japan

[21] Appl. No.: 263,353

[22] Filed: Oct. 27, 1988

[30] Foreign Application Priority Data

Nov. 18, 1987 [JP] Japan ................. 62-290875

[51] Int. Cl.$^5$ ............................................. C25D 13/00
[52] U.S. Cl. .............................. 204/182.3; 204/182.4
[58] Field of Search ........................... 204/182.3, 182.4

[56] References Cited

FOREIGN PATENT DOCUMENTS 840982 8/1976 Belgium .
0269234 6/1988 European Pat. Off. .
86/06646 11/1986 World Int. Prop. O. .

OTHER PUBLICATIONS

Basta, N., "Use Electrodialytic Membranes for Waste Recovery", *Chemical Engineering*, vol. 83, No. 5 (Mar. 3, 1986), pp. 42 & 43.
Patent Abstracts of Japan, vol. 11, No. 206, Jul. 3, 1987, & JP-A-62 27 580.

*Primary Examiner*—John F. Niebling
*Assistant Examiner*—Isabelle Rodriguez
*Attorney, Agent, or Firm*—Oblon, Spivak, McClelland, Maier & Neustadt

[57] ABSTRACT

A method for regenerating a waste liquor containing nitric acid and hydrofluoric acid to recover highly pure nitric and hydrofluoric acids therefrom. The method comprises adding hydrofluoric acid, or an acid mixture of nitric and hydrofluoric acids having a major content of the hydrofluoric acid, to a nitric acid and hydrofluoric acid waste liquor, and subjecting the resulting mixture to dialysis with an ion-exchange electrodialyzer to recover the dialyzed acids. The acid-removed solution is neutralized to cause a precipitate to form and the precipitate is separated. The resultant solution is subjected to an ion-exchange membrane electrodialyzer using a combination of a bipolar membrane, an anion-exchange membrane and a cation-exchange membrane for separation into the acids and the alkali, which are subsequently recovered. The process has a high current efficiency and high recovery rates for acids.

4 Claims, 2 Drawing Sheets

FIG. I

PROCESS FOR RECOVERING NITRIC ACID AND HYDROFLUORIC ACID FROM WASTE PICKLE LIQUORS

BACKGROUND OF THE INVENTION

1. Field of the Invention

This invention relates to the regeneration of waste liquors containing nitric and hydrofluoric acids. More particularly, the invention relates to a process for continuously regenerating and recovering highly pure nitric acid and hydrofluoric acid from a waste liquor containing metal ions along with nitric acid and hydrofluoric acid as discharged from a pickling procedure wherein metal materials are pickled with nitric acid and hydrofluoric acid.

2. Description of the Prior Art

As is well known in the art, when stainless steels or titanium is annealed, metal oxides scales are inevitably formed on the surfaces of the steels or titanium. For the removal of the scales, usual practice is to pickle such stainless steels or titanium with a mixed acid mainly composed of nitric acid and hydrofluoric acid. As the pickling continues, Fe, Cr, Ni, Ti and the like metals are more and more dissolved in the mixed acid. This results in a reduced amount of the free acids present in the mixed acid, with a lowering of the pickling capability. Accordingly, substitution with a fresh mixed acid becomes necessary, and the used mixed acid containing the metal ions is discharged as a waste liquor.

The waste liquor, i.e. the mixed acid waste liquor containing the metal ions, is currently treated by a lime neutralization process and is discharged in public waters in a harmless form. However, the above treatment involves problems including formation of sludges of metal hydroxides and $CaF_2$ in large amounts and an environmental problem that all the nitrogen contained in the nitric acid is discharged to public waters and causes eutrophication. In addition, the discharge of the expensive, unreacted acid components presents a problem from the standpoint of resource saving.

To solve the problems, many studies have been made on the processes for the regeneration and recovery of nitric and hydrofluoric acids from the waste liquor, including an extraction and distillation process using sulfuric acid, a solvent extraction process and a diffusion dialysis process. Some of these processes are practically in use with problems to be solved from the standpoints of economy, recovery rate and environmental protection.

Accordingly, further studies have been recently made. For instance, there has been proposed in published Japanese Patent Application No. 62-502695 a process of regenerating a nitric acid and hydrofluoric acid waste liquor by the use of a bipolar membrane (a membrane composed of anion and cation exchange layers). In this process, the mixed acid waste liquor containing metal ions is neutralized to cause the metal ions to precipitate and is separated into the precipitate and an aqueous solution of salts, thereby removing the metal ions. The aqueous salt solution obtained after the neutralization and separation is subjected to an ion-exchange electrodialyzer using a combination of a bipolar membrane, an anion-exchange membrane and a cation-exchange membrane, thereby regenerating and recovering nitric acid and hydrofluoric acid and alkalis.

The above process can be advantageously carried out by a closed system in which any waste liquor is not discharged from the treating system. Accordingly, the waste liquor can be regenerated without causing any environmental problem and discharging expensive unreacted acid components. Thus, the above mixed acid waste liquor regeneration process is beneficial from the viewpoint of environmental protection and resource saving.

However, the mixed acid regeneration process using the bipolar membrane is disadvantageous in that when a mixed acid water liquor having a high content of nitric acid is treated, a current efficiency becomes very low in the step of regenerating and recovering nitric and hydrofluoric acids and alkalis by means of an ion-exchange electrodialyzer, making the regeneration and recovery almost impossible in an industrial sense.

SUMMARY OF THE INVENTION

It is accordingly an object of the invention to provide a process for regenerating a nitric acid and hydrofluoric acid waste pickle liquor to recover highly pure nitric and hydrofluoric acids whereby a high current efficiency and a high regeneration and recovery rate are ensured without a sacrifice of the advantages involved in the known regeneration and recovery process using a bipolar membrane.

It is another object of the invention to provide a process for regenerating the mixed acid waste liquor which is carried out by the use of a small load exerted on an apparatus.

It is a further object of the invention to provide a process for regenerating the mixed acid waste liquor wherein regeneration and recovery rates for the acids are high even when the waste liquor has a high content of nitric acid.

The above objects can be achieved, according to the invention, by a method for regenerating a waste liquor containing nitric acid and hydrofluoric acid to recover highly pure nitric and hydrofluoric acids therefrom which comprises:

adding hydrofluoric acid, or an acid mixture of nitric and hydrofluoric acids having a major content of the hydrofluoric acid, to a nitric acid and hydrofluoric acid waste liquor;

subjecting the resulting mixture to removal of the acids by dialysis with an ion-exchange membrane electrodialyzer for acid recovery to recover the dialyzed acids;

neutralizing the solution, from which the acids have been removed, with an alkali;

separating the resultant precipitate from the neutralized solution;

subjecting the separated solution to an ion-exchange membrane electrodialyzer using a combination of a bipolar membrane, an anion-exchange membrane and a cation-exchange membrane for separation into the acids and the alkali; and recovering the separated acids and alkali.

As will be apparent from the above procedure, even if the nitric acid and hydrofluoric acid waste liquor contains a large amount of nitric acid, the method ensures a high current efficiency and high recovery rates for the acids and the alkali with a relatively small load imposed on the dialyzer.

DETAILED DESCRIPTION AND EMBODIMENTS OF THE INVENTION

Figure 1:
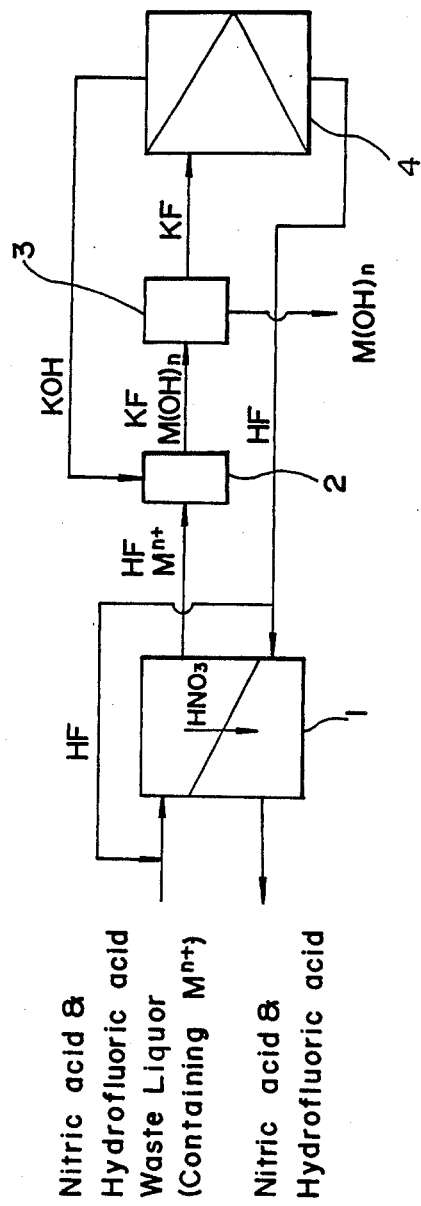
FIG. 1 is a flow chart showing a regeneration and recovery process for a nitric acid and hydrofluoric acid waste liquor used in Example 1.

In the first step of the regeneration and recovery process according to the invention, hydrofluoric acid or a mixture of nitric and hydrofluoric acids having a higher concentration of hydrofluoric acid is added to a waste liquor containing nitric and hydrofluoric acids and metal ions, e.g. a pickle waste liquor. By the addition, the fluorine ions, $F^-$, in the waste liquor increase in amount so that the $F^-$ combines with metal ions (which may be hereinafter referred to simply as $M^{n+}$) in the waste liquor which have combined with nitrate ions, $NO_3^-$. This permits free $NO_3^-$ to increase in amount.

The waste liquor obtained in the first step is subsequently subjected to dialysis by means of an ion-exchange membrane electrodialyzer for acid collection. This electrodialyzer has a plurality of cells, each consisting of a pair of an anion exchange membrane and a cation exchange membrane. The cell constitutes a dilution chamber and a concentration chamber partitioned with the membranes. When the acid waste liquor containing metal ions is charged into the dilution chamber and a direct current is passed between electrodes provided at opposite ends of the dialyzer, the acid components are dialyzed and transferred into the concentration chamber, thereby accomplishing removal of the acids or dilution.

The $M^{n+}$ or metal ions in the waste liquor preferentially combine with the fluorine ions. However, if the metal ions are contained in large amounts with $F^-$ contained in small amounts, they will combine not only with $F^-$ but also with nitrate ions. Accordingly, free $NO_3^-$ to be dialyzed is reduced in amount correspondingly, with a reduction in amount of the nitric acid transferred and separated in the concentration chamber.

Since hydrofluoric acid or a mixed acid enriched with hydrofluoric acid is added to the waste liquor in the first step, the fluorine ions in the liquor increase in amount and combine with the metal ions in the waste liquor, allowing free $NO_3^-$ to increase in amount. Fundamentally, $NO_3^-$ is more likely to pass through the membranes than $F^-$. Accordingly, nitric acid can be more readily transferred to and separated in the concentration chamber.

In the dilution chamber, the solution from which the acid has been removed is present. This solution contains the metal ions with a reduced amount of nitric acid and may be a diluted nitric acid and hydrofluoric acid solution. By the addition of a controlled amount of the hydrofluoric acid with or without nitric acid to the waste liquor, substantially all the nitric acid in the starting waste liquor can be recovered by transference to the concentration chamber.

Alternatively, it is very easy to control a molar ratio of the fluorine ions and the nitrate ions ($F^-/NO_3^-$) in the acid-removed solution at not less than 1 by adding hydrofluoric acid or a hydrofluoric acid-enriched mixture of nitric acid and hydrofluoric acid in a predetermined amount. This solution having a molar ratio of $F^-/NO_3^-$ of not less than 1 is advantageous from the viewpoint of current efficiency as will be described hereinafter.

The acid-removed solution is subsequently neutralized and the resultant precipitate is separated from the solution. By the neutralization treatment, the metal ions are precipitated as hydroxides and can be removed such as by filtration. More particularly, when the precipitate is subjected to filter pressing, a solid filter cake is obtained and can be discharged as it is.

On the other hand, the solution or filtrate from which the precipitate has been removed has an $F^-/NO_3^-$ ratio of not less than 1 since the molar ratio of the acid-removed solution has been not less than 1. The filtrate is one which is obtained by neutralizing the diluted acid-removed solution with low concentrations of the acids and thus, the concentrations of $F^-$ and $NO_3^-$ are low.

In a next step, the separated solution or filtrate is treated with an ion-exchange membrane electrodialyzer using a combination of a bipolar membrane, an anion-exchange membrane and a cation-exchange membrane to recover the acids and alkalis. In the practice of the invention, this electrodialysis can be carried out at a high current efficiency and high recovery rates. In addition, the load imposed on the dialyzer can be reduced. Especially, even with a starting waste liquor having a high content of nitric acid, a high recovery rate can be attained. This is because the $F^-/NO_3^-$ molar ratio in the separated solution is not less than 1 and the concentration of the salts is small.

The ion-exchange membrane electrodialyzer has a plurality of cells, each consisting of a combination of a bipolar membrane, an anion-exchange membrane and a cation-exchange membrane. Each cell has a dilution chamber acting as a salt line partitioned with the membranes, and concentration chambers provided at opposite sides of the dilution chamber and serving as an alkali-circulating line and an acid-circulating line, respectively. In this dialyzer, when the separated solution or filtrate, i.e. an aqueous salt solution, is circulated to the salt line and a direct current is passed between electrodes provided at opposite ends of the dialyzer, desalting takes place in the aqueous salt solution. As a result, an alkali is regenerated and recovered in the alkali-circulating line and an aqueous nitric acid and hydrofluoric acid solution enriched with hydrofluoric acid is regenerated and recovered in the acid-circulating line.

Part of the recovered acid may be used as an acid for addition to a starting waste liquor. The recovered acid is a mixture of nitric acid and hydrofluoric acid which is enriched with hydrofluoric acid and has an $F^-/NO_3^-$ molar ratio of not less than 1. Accordingly, if this recovered acid is added to a starting waste liquor, the content of $F^-$ in the waste liquor can increase with an attendant increase of free $NO_3^-$, so that the $F^-/NO_3^-$ molar ratio of the acid-removed solution can be controlled to be not less than 1.

The reason why the $F^-/NO_3^-$ molar ratio in the acid-removed solution is determined at not less than 1 in the practice of the invention is as follows. When the $F^-/NO_3^-$ molar ratio is less than 1, the current efficiency for the recovery becomes low as will be particularly described in Example 2. Especially, when a waste liquor containing a large amount of nitric acid is treated, both the current efficiency and the recovery rate lower to substantial extents. In the practice of the invention, the $F^-/NO_3^-$ molar ratio is preferably not less than 1, more preferably not less than 1.5.

The acid to be added to a starting waste liquor may be part of the acid regenerated and recovered in the process of the invention. At the time of starting the regeneration and recovery step, fresh hydrofluoric acid or mixed acid enriched with hydrofluoric acid is usually provided for addition to the waste liquor. Alternatively, any acid may not be added at the start. In the latter case, a mixture of nitric and hydrofluoric acids having a high content of hydrofluoric acid which is obtained after a time of carrying out the process may be added to the waste liquor.

In the practice of the invention, the regenerated and recovered alkali may be re-utilized as an alkali for neutralization. The solution from which salts have been removed in the salt line may be re-utilized as a solution to be charged into an acid-circulating line.

Since the regenerated acid and alkali may be re-utilized and/or recovered and the desalted solution may also be re-utilized, the process can be carried out by a closed system in which any waste liquor and treating liquor are not discharged from the system.

The present invention is more particularly described by way of examples.

EXAMPLE 1

A waste liquor discharged from pickling of an annealed stainless steel with nitric and hydrofluoric acids, i.e. a nitric acid and hydrofluoric acid waste liquor containing $M^{n+}$, was treated for regeneration and recovery according to the process of the invention. This treatment is particularly shown in the flow chart of FIG. 1. As shown in the figure, the treating system was a closed system where no waste liquor and treating solutions were discharged. In the figure, $HNO_3$ indicates nitric acid, HF indicates hydrofluoric acid, KF indicates potassium fluoride, $M(OH)_n$ indicates a metal hydroxide or a metal hydroxide precipitate, and KOH indicates potassium hydroxide.

A starting waste liquor having a composition of 60 g/liter of $Fe^{3+}$, 5 g/liter of $Ni^{2+}$, 5 g/liter of $Cr^{3+}$, 50 g/liter of hydrofluoric acid and 200 g/liter of nitric acid was provided. Separately provided hydrofluoric acid was added to the starting waste liquor in such an amount of a gram equivalent by 10% larger than a gram equivalent of $NO_3^-$ which was considered to combine with $M^{n+}$. The reason why the gram equivalent increased by 10% was used was to recover a predetermined concentration of nitric and hydrofluoric acids. In other words, the concentration effect by an ion-exchange membrane electrodialyzer 1 for acid recovery was utilized. In this connection, however, when a hydrofluoric acid-enriched acid mixture was recovered, part of the mixture was used.

The acid-added waste liquor was introduced into the dialyzer 1 to remove the acids by dialysis. The dialyzer 1 had 10 cells, each consisting of a pair of anion-exchange membrane and cation-exchange membrane and an effective membrane area of 20 dm². The dialyzer was operated at a temperature of the waste liquor of 30° C., a current density of 5 A/dm², and a circulation flow rate of 5 cm/second. As a result, there was recovered at a quantity of electricity of 210 AH a mixed acid containing 200 g/liter of nitric acid, 50 g/liter of hydrofluoric acid, 1 g/liter of $Fe^{3+}$, 0.3 g/liter of $Ni^{2+}$ and 0.4 g/liter of $Cr^{3+}$. The current efficiency was 50%. The resultant acid-removed solution had an $F^-/NO_3^-$ molar ratio of 2.1.

The acid-removed solution was subsequently charged into a neutralization tank 2, to which an alkali such as KOH was added to such an extent that a hydrogen ion concentration reached 10, followed by allowing to stand for 24 hours. The solution was dehydrated by the use of a filter press 3 having a filtration area of 30 cm square thereby separating the resultant precipitate as a solid dehydrate cake. On the other hand, the separated solution was introduced into an ion-exchange membrane electrodialyzer 4 using a combination of a bipolar membrane, an anion-exchange membrane and a cation-exchange membrane in order to allow desalting by dialysis. The dialyzer 4 had eight cells, each consisting of a combination of a bipolar membrane, an anion-exchange membrane and a cation-exchange membrane with an effective membrane area of 10 dm². The cell was operated under conditions of a solution temperature of 40° C., a current density of 10 A/dm² and a circulation flow rate of 5 cm/second. The conductivity of the salt circulation line was constant at 40000 μs/cm. As a result, there were recovered hydrofluoric acid at a concentration of 4N in the acid circulation line and KOH at a concentration of 1.5N in the alkali circulation line. The current efficiency was 70%.

The recovered KOH was introduced into the neutralization tank 2 for re-utilization as an alkali for the neutralization. The desalted solution in the salt line was also re-utilized as a solution charged to the acid circulation line of the electrodialyzer 4. The regenerated and recovered hydrofluoric acid was introduced into the concentration chamber of the ion-exchange membrane electrodialyzer 1, and was combined with an acid obtained by dialysis in the concentration chamber of the dialyzer 1 and recovered as nitric and hydrofluoric acids.

EXAMPLE 2

Figure 2:
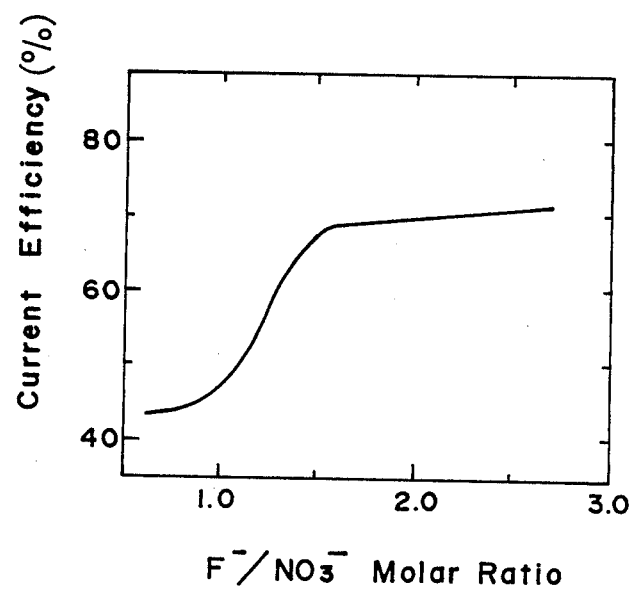
FIG. 2 is a graphical representation of a current efficiency in relation to the variation in $F^-/NO_3^-$ molar ratio in a solution being treated in an ion-exchange membrane electrodialyzer using a bipolar membrane.

The general procedure of Example 1 was repeated except that different $F^-/NO_3^-$ molar ratios were used in the aqueous salt solution being treated in the dialyzer 4 to determine a current efficiency. The results are shown in FIG. 2, revealing that when the $F^-/NO_3^-$ molar ratio is less than 1, the current efficiency is low. However, when the molar ratio exceeds 1, the current efficiency abruptly increases. The molar ratio of 1.5 or over is very advantageous from the standpoint of the current efficiency.

What is claimed is:

1. A method for regenerating a waste liquor containing nitric acid and hydrofluoric acid to recover highly pure nitric and hydrofluoric acids therefrom which comprises:

adding hydrofluoric acid, or an acid mixture of nitric and hydrofluoric acids having a major content of the hydrofluoric acid, to a nitric acid and hydrofluoric acid waste liquor;

subjecting the resulting mixture to removal of the acids by dialysis with an ion-exchange electrodialyzer for acid recovery to recover the dialyzed acids; in such an amount that the solution obtained after the acid removal has a molar ratio of fluorine ions and nitrate ions of at least 1 or greater;

neutralizing the solution, from which the acids have been removed, with an alkali;

separating the resultant precipitate from the neutralized acid-removed solution;

subjecting the separated solution to an ion-exchange membrane electrodialyzer using a combination of a bipolar membrane, an anion-exchange membrane and a cation-exchange membrane for separation into the acids and the alkali; and
recovering the separated acids and alkali.

2. A process according to claim 1, wherein the hydrofluoric acid or the acid mixture being added to the waste liquor is part of the recovered acid.

3. A process according to claim 1, wherein the molar ratio is not less than 1.5.

4. A process according to claim 1, wherein said process is carried out by a closed system.

* * * * *